US012741449B2

(12) United States Patent
Fujimoto et al.

(10) Patent No.: US 12,741,449 B2
(45) Date of Patent: Sep. 22, 2026

(54) FILM-LAMINATED METAL SHEET AND METHOD OF PRODUCING THE SAME, SUBSTRATE FOR FLEXIBLE ELECTRONICS, AND ORGANIC EL SUBSTRATE

(71) Applicant: JFE Steel Corporation, Tokyo (JP)

(72) Inventors: Soichi Fujimoto, Tokyo (JP); Yasuhide Oshima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 332 days.

(21) Appl. No.: 18/549,534

(22) PCT Filed: Mar. 22, 2022

(86) PCT No.: PCT/JP2022/013028

§ 371 (c)(1), (2) Date: Sep. 7, 2023

(87) PCT Pub. No.: WO2022/202771

PCT Pub. Date: Sep. 29, 2022

(65) Prior Publication Data

US 2024/0300216 A1 Sep. 12, 2024

(30) Foreign Application Priority Data

Mar. 23, 2021 (JP) ................................ 2021-048712

(51) Int. Cl.

*B32B 15/082* (2006.01)
*B32B 15/09* (2006.01)
*B32B 37/06* (2006.01)

(52) U.S. Cl.

CPC ............ *B32B 15/082* (2013.01); *B32B 15/09* (2013.01); *B32B 37/06* (2013.01); *B32B 2311/24* (2013.01); *B32B 2311/30* (2013.01); *B32B 2367/00* (2013.01); *B32B 2369/00* (2013.01); *B32B 2457/00* (2013.01)

(58) Field of Classification Search

None

See application file for complete search history.

(56) References Cited

U.S. PATENT DOCUMENTS

2010/0310824 A1* 12/2010 Oshima ................... B32B 27/20 428/141
2015/0367605 A1* 12/2015 Morikawa ......... B29C 45/14311 427/388.1
2018/0257978 A1* 9/2018 Minamidate ............ B32B 27/14
2019/0187841 A1* 6/2019 Kuwabara ............... B32B 15/08
2021/0029823 A1* 1/2021 Hosoi ..................... B32B 15/20
2022/0093882 A1 3/2022 Fujimoto et al.

FOREIGN PATENT DOCUMENTS

EP 3372382 A1 * 9/2018 ............ B32B 27/20
EP 3812146 A1 * 4/2021 ............ B32B 37/10
JP 2006160999 A * 6/2006 ............ B32B 15/09
JP 2014-208479 A 11/2014
JP 2015-195315 A 11/2015
JP 2016193580 A * 11/2016 ............ B32B 15/08
KR 960000732 B1 * 1/1996 ............ B32B 15/08
WO WO-2015151773 A1 * 10/2015 ........... H10K 59/873
WO 2016/001971 A1 1/2016
WO 2017/077752 A1 5/2017
WO 2020/137783 A1 7/2020

OTHER PUBLICATIONS

Atake—KR 940002048 B—MT+Google—laminated metal sheet—1996 (Year: 1998).*
Inui—JP 2006-160999 A—KR D2—MT—PET polyester lam metal—friction—2006 (Year: 2006).*
Hirano—WO 2015-151773 A1—KR D3—MT—metal substrate—2015 (Year: 2015).*
Kanefuji—JP 2016-193580 A—Euro D2—MT—coated metal for electronic substrate—2016 (Year: 2016).*
Sim—hypo-crystals—PMMA amorphous—Mat. Today—Nov. 2020 (Year: 2020).*
Engineering Toolbox—Friction—Coefficients for Common Materials and Surfaces—Jan. 3, 2026 (Year: 2026).*
Engineers Edge—Coefficient of Friction Equation and Table Chart—Jan. 3, 2026 (Year: 2026).*
Extended European Search Report dated Jun. 28, 2024, of counterpart European Patent Application No. 22775555.0.
International Search Report dated May 31, 2022, of counterpart International Application No. PCT/JP2022/013028 along with an English translation.
Office Action dated Oct. 20, 2022, of counterpart Taiwanese Application No. 111110867 with an English translation of the Search Report.
Office Action dated Aug. 29, 2023, of counterpart Japanese Application No. 2022-545352 with a Concise Statement of Relevance in English.
Office Action dated Jul. 30, 2025, from counterpart Korean Patent Application No. 2023-7030282.
Office Action dated Apr. 26, 2025, from counterpart Chinese Patent Application No. 2022800215538.
Office Action dated Oct. 1, 2025, from counterpart Chinese Patent Application No. 202280021553.8.
Office Action dated Mar. 28, 2026, from counterpart Korean Application No. 10-2023-7030282.

* cited by examiner

*Primary Examiner* — John Vincent Lawler
(74) *Attorney, Agent, or Firm* — DLA Piper LLP (US)

(57) ABSTRACT

A film-laminated metal sheet satisfies smoothness, heat resistance, flexibility, and gas barrier properties and has a low environmental burden and excellent productivity and a method produces the metal sheet, a substrate for flexible electronics, and an organic EL substrate. The film-laminated metal sheet has at least one surface covered with a resin film. The arithmetic average roughness Sa of a surface of the resin film is 0.030 μm or less. The maximum peak height Sp of the surface of the resin film is 0.30 μm or less. The maximum valley depth Sv of the surface of the resin film is 1.0 μm or less.

10 Claims, No Drawings

FILM-LAMINATED METAL SHEET AND METHOD OF PRODUCING THE SAME, SUBSTRATE FOR FLEXIBLE ELECTRONICS, AND ORGANIC EL SUBSTRATE

TECHNICAL FIELD

This disclosure relates to a film-laminated metal sheet and a method of producing the metal sheet, a substrate for flexible electronics, and an organic EL substrate.

BACKGROUND

Flexible electronics is a general term for technologies using electronic circuits characterized by being bendable due to the use of a flexible material. Flexible electronics have achieved a cost reduction through organic electronics based on an organic material and through the use of a coating or printing technique. By combining such flexible electronics with, for example, printed electronics, by which devices can be easily produced, various functional products can be created. Flexible electronics include various technologies such as organic electroluminescence (EL), organic thin-film solar cells, organic transistors, electronic paper, flexible batteries, and various flexible sensors.

Conventionally, materials such as glass, which has excellent flatness, heat resistance, and gas barrier properties, and resin films, which have excellent flexibility, have been mainly used as a substrate for flexible electronics such as organic EL. However, it is not easy to simultaneously satisfy smoothness, heat resistance, gas barrier properties, and flexibility, which are most important for a substrate for flexible electronics. Accordingly, attempts have been made thus far, including reducing the thickness and increasing the strength of glass to impart flexibility, and providing a gas barrier layer on the surface of a resin film to impart gas barrier properties. However, such methods have many problems such as insufficient performance and high cost. To solve these problems, a method, which involves covering a metal sheet with an insulating film, has begun to be proposed.

International Publication No. WO 2016/001971, Japanese Unexamined Patent Application Publication No. 2014-208479 and Japanese Unexamined Patent Application Publication No. 2015-195315 each disclose a method of covering a metal sheet with an insulating film. International Publication No. WO 2016/001971 has proposed a method which involves subjecting a steel material containing Al and Si each in a controlled amount to thermal oxidation to form an insulating film containing at least one of $Al_2O_3$ and $SiO_2$ and an insulating film composed of a silica-based inorganic-organic hybrid material. Japanese Unexamined Patent Application Publication No. 2014-208479 has proposed a method which involves baking a film-forming composition containing a thermosetting resin and having a solid pigment volume fraction of 20% or less to form an insulating film on a metal sheet. Japanese Unexamined Patent Application Publication No. 2015-195315 has also proposed a metal sheet to which a thermoplastic resin film having a solid pigment volume fraction of 20% or less is laminated with an adhesive.

However, the method described in International Publication No. WO 2016/001971 uses an organic solvent and requires a high-temperature heat treatment, leading to a high environmental burden. In addition, since the insulating film is a thin film containing an inorganic material as a main component, a short circuit may occur due to a pinhole, and the insulating film also has poor flexibility. The method described in Japanese Unexamined Patent Application Publication No. 2014-208479 also includes a process which uses an organic solvent and requires drying and solidification by heat treatment. The method described in Japanese Unexamined Patent Application Publication No. 2015-195315 includes a process which involves a high cost for the application of an adhesive and which has low productivity due to a long time taken for the solidification of the adhesive. In addition, the thermoplastic film has insufficient insulating properties because an insulation failure may occur due to sharp irregularities in the surface of the thermoplastic film.

It could therefore be helpful to provide a film-laminated metal sheet which satisfies smoothness, heat resistance, flexibility, and gas barrier properties and has a low environmental burden and excellent productivity, a method of producing the metal sheet, and a substrate for flexible electronics and an organic EL substrate.

SUMMARY

We thus provide:

[1] A film-laminated metal sheet having at least one surface covered with a resin film, wherein an arithmetic average roughness Sa of a surface of the resin film is 0.030 μm or less, a maximum peak height Sp of the surface of the resin film is 0.30 μm or less, and a maximum valley depth Sv of the surface of the resin film is 1.0 μm or less.

[2] The film-laminated metal sheet as set forth in [1], wherein kurtosis Sku of the surface of the resin film is 3.0 or less.

[3] The film-laminated metal sheet as set forth in [1] or [2], wherein ash content of the resin film is 1000 ppm or less.

[4] The film-laminated metal sheet as set forth in any one of [1] to [3], wherein a static friction coefficient μs of the resin film is not less than 0.10 and not more than 1.0.

[5] The film-laminated metal sheet as set forth in any one of [1] to [4], wherein a ratio of a cold crystallization heat ΔHc to a melting heat ΔHm (ΔHc/ΔHm) obtained from DSC measurement of the resin film is 0.30 or less.

[6] The film-laminated metal sheet as set forth in any one of [1] to [5], wherein a glass transition point Tg of the resin film is not less than 120° C. and not more than 200° C.

[7] The film-laminated metal sheet as set forth in any one of [1] to [6], wherein thickness of the resin film is not less than 10 μm and not more than 100 μm.

[8] The film-laminated metal sheet as set forth in any one of [1] to [7], wherein the resin film contains a polyester resin, an acrylic resin, or a polycarbonate resin as a main component.

[9] A method of producing the film-laminated metal sheet as set forth in any one of [1] to [8], comprising covering a metal sheet with the resin film by thermal lamination.

[10] A substrate for flexible electronics comprising the film-laminated metal sheet as set forth in any one of [1] to [8].

[11] An organic EL substrate comprising the film-laminated metal sheet as set forth in any one of [1] to [8].

We thus make it possible to provide a film-laminated metal sheet that satisfies smoothness, heat resistance, flexibility, and gas barrier properties required for a substrate for flexible electronics and has a low environmental burden and excellent productivity. Therefore, the film-laminated metal sheet can be used as a substrate for flexible electronics or as an organic EL substrate.

DETAILED DESCRIPTION

Our sheets, methods and substrates will now be described.

Our film-laminated metal sheet has at least one surface covered with a resin film. The metal sheet is excellent in both flexibility and gas barrier properties, which are necessary, for example, for organic EL. In addition, by covering at least one surface of the metal sheet with the resin film, the smoothness and electrical insulating properties of the resin film can be imparted to the metal sheet. Further, by laminating the resin film to the metal sheet, a dimensional change of the film upon heating is reduced. Therefore, the heat resistance of the laminated film is superior to that of the resin film alone.

In the film-laminated metal sheet, the arithmetic average roughness Sa of a surface of the resin film is 0.030 μm or less. The arithmetic average roughness Sa of the surface of the resin film is more preferably 0.025 μm or less, even more preferably 0.020 μm or less, and particularly preferably 0.015 μm or less. If the arithmetic average roughness Sa exceeds 0.030 μm when the film-laminated metal sheet is used, for example, as an organic EL substrate, a slight short circuit may occur and a leakage current may flow upon application of a voltage, resulting in a decrease in luminescent efficiency. While the arithmetic average roughness Sa is ideally as close to 0 as possible from the above viewpoint, there is actually a lower limit of 0.001 μm. To allow the arithmetic average roughness Sa of the surface of the resin film to fall within the above range, it is important to press the resin film during lamination to not worsen the surface shape of the resin film. For this purpose, a resin film containing no lubricant or a small amount of finely dispersed lubricant may be used as will be described later. The arithmetic average roughness Sa worsens also due to scratches formed during transportation, transfer marks formed by a thermal lamination roller and the like. Therefore, it is preferred to attach a protective film in advance to the surface of the resin film which is not to be bonded to the metal sheet.

In the film-laminated metal sheet, the maximum peak height Sp of the surface of the resin film is 0.30 μm or less. The maximum peak height Sp of the surface of the resin film is more preferably 0.25 μm or less, even more preferably 0.20 μm or less, and particularly preferably 0.15 μm or less. If the maximum peak height Sp of the surface of the resin film exceeds 0.30 μm when the film-laminated metal sheet is used, for example, as an organic EL substrate, non-luminescent defects, or non-luminescent spots called dark spots, may be formed. While the maximum peak height Sp is ideally as close to 0 as possible from the above viewpoint, there is actually a lower limit of 0.001 μm. To allow the maximum peak height Sp of the surface of the resin film to fall within the above range, it is important to press the resin film during lamination to not worsen the surface shape of the resin film. For this purpose, a resin film containing no lubricant or a small amount of finely dispersed lubricant may be used as will be described later. The maximum peak height Sp worsens also due to adhesion of foreign matter during transportation and entry of air bubbles between the film and the metal sheet during thermal lamination. Therefore, it is preferred to attach a protective film in advance to the surface of the resin film which is not to be bonded to the metal sheet, or to control the lamination conditions to reduce the entry of air bubbles.

In the film-laminated metal sheet, the maximum valley depth Sv of the surface of the resin film is 1.0 μm or less. The maximum valley depth Sv of the surface of the resin film is more preferably 0.50 μm or less, even more preferably 0.30 μm or less, and particularly preferably 0.15 μm or less. If the maximum valley depth Sv of the surface of the resin film exceeds 1.0 μm when the film-laminated metal sheet is used, for example, as an organic EL substrate, a short circuit may occur and no light may be emitted. While the maximum valley depth Sv is ideally as close to 0 as possible from the above viewpoint, there is substantially a lower limit of 0.001 μm. To allow the Sv of the surface of the resin film to fall within the above range, it is important to use a resin film having high surface smoothness and not to worsen the surface shape of the resin film during lamination. The Sv worsens also due to scratches formed during transportation, transfer marks formed by a thermal lamination roller, and excessive pressing during lamination. Therefore, it is preferred to attach a protective film in advance to the surface of the resin film which is not to contact the metal sheet, or to control the lamination temperature and the surface pressure applied.

In the film-laminated metal sheet, the kurtosis Sku of the surface of the resin film is preferably 3.0 or less. The kurtosis Sku of the surface of the resin film is more preferably 2.8 or less, even more preferably 2.6 or less, and particularly preferably 2.5 or less. When the kurtosis Sku of the surface of the resin film is 3.0 or less when the film-laminated metal sheet is used, for example, as an organic EL substrate, the decrease in luminescent efficiency due to leakage current and the formation of dark spots are further reduced. While the kurtosis Sku is ideally as close to 0 as possible from the above viewpoint, there is actually a lower limit of 0.001. To allow the kurtosis Sku of the surface of the resin film to fall within the above range, it is important to press the resin film during lamination to not worsen the surface shape of the resin film. For this purpose, a resin film containing no lubricant or a small amount of finely dispersed lubricant may be used as will be described later. The kurtosis Sku worsens also due to transfer of the surface shape of a thermal lamination roller. Therefore, it is preferred to attach a protective film in advance to the surface of the resin film which is not to contact the metal sheet.

In the film-laminated metal sheet, the ash content of the resin film is preferably 1000 ppm (by mass, the same applies hereinafter) or less. The ash content of the resin film is more preferably 800 ppm or less, even more preferably 600 ppm or less, and particularly preferably 500 ppm or less. When the ash content of the resin film is 1000 ppm or less when the film-laminated metal sheet is used, for example, as an organic EL substrate, the decrease in luminescent efficiency due to leakage current and the formation of dark spots are further reduced. To allow the ash content of the resin film to fall within the above range, it is preferred to use a resin film containing no lubricant or a small amount of dispersed lubricant as will be described later, or to laminate the resin film by thermal lamination without using an adhesive.

In the film-laminated metal sheet, the static friction coefficient μs of the resin film is preferably not less than 0.10 and not more than 1.0. The lower limit of the static friction coefficient μs of the resin film is more preferably not less than 0.30, even more preferably not less than 0.40, and particularly preferably not less than 0.50. The upper limit of the static friction coefficient μs of the resin film is more preferably not more than 0.95, even more preferably not more than 0.90, and particularly preferably not more than 0.85. When the static friction coefficient μs of the resin film is not more than 1.0 when the film-laminated metal sheet is used, for example, as an organic EL substrate, the formation of flaws on a roller during a production process is further reduced. On the other hand, when the static friction coefficient μs of the resin film is not less than 0.10 when the film-laminated metal sheet is used, for example, as an organic EL substrate, meandering on a roller during a production process is further reduced. To allow the μs of the resin film to fall within the above range, it is preferred to use a resin film containing no lubricant or a small amount of dispersed lubricant as will be described later. Further, it is preferred to use a film made of a polyester resin, an acrylic resin, or a polycarbonate resin.

In the film-laminated metal sheet, the ratio of the cold crystallization heat ΔHc to the melting heat ΔHm (ΔHc/ΔHm) obtained from differential scanning calorimeter (DSC) measurement of the resin film is preferably 0.30 or less.

DSC refers to differential scanning calorimetry. The ΔHc/ΔHm of the resin film is more preferably 0.25 or less, even more preferably 0.20 or less, and particularly preferably 0.15 or less. The ΔHc/ΔHm of the resin film is preferably as small as possible. When the resin film is not subject to cold crystallization, i.e., when ΔHc is 0 J/g, the ΔHc/ΔHm is 0, which is substantially the lower limit. That the resin film is not subject to cold crystallization indicates that in a resin film made of a crystalline thermoplastic resin, its crystallization has fully progressed, and unless the resin film is melted once, its crystallization by heat does not progress. On the other hand, that the crystalline thermoplastic resin is subject to cold crystallization indicates that many amorphous regions are present in the resin film, and the amorphous regions are crystallized by heat. When a crystalline thermoplastic resin is laminated to a metal sheet by thermal lamination, the surface of the resin film is generally melted by heat and then bonded to the metal sheet. Therefore, the molten resin becomes amorphous when it is cooled. However, if the surface of the crystalline thermoplastic resin film is melted excessively during thermal lamination, the surface shape of the film-laminated metal sheet may be worsened. Therefore, to obtain a film-laminated metal sheet having high smoothness, it is important to control the lamination conditions so that the crystalline thermoplastic resin film does not melt excessively during thermal lamination, i.e., the resin film of the film-laminated metal sheet will not be cold-crystallized. That is, that the ΔHc/ΔHm of the resin film is low means that the crystalline thermoplastic resin film has not melted excessively during thermal lamination. Therefore, the ΔHc/ΔHm is preferably 0.30 or less because a highly smooth film-laminated metal sheet can be obtained. The upper limit of the ΔHc/ΔHm of the resin film is 1, which means that the crystalline thermoplastic resin film has become completely amorphous upon thermal lamination. An amorphous resin is not subject to cold crystallization.

In the film-laminated metal sheet, the glass transition point Tg of the resin film is preferably not less than 120° C. and not more than 200° C. The lower limit of the glass transition point Tg of the resin film is more preferably not less than 130° C., even more preferably not less than 140° C., and particularly preferably not less than 150° C. The upper limit of the glass transition point Tg of the resin film is more preferably not more than 195° C., even more preferably not more than 190° C., and particularly preferably not more than 185° C. When the glass transition point Tg of the resin film is not more than 200° C., thermal lamination can be performed more reliably. On the other hand, when the glass transition point Tg of the resin film is not less than 120° C. when the film-laminated metal sheet is used, for example, as an organic EL substrate, deformation of the surface of the resin film by heat during a production process is further reduced. To allow the Tg of the resin film to fall within the above range, it is preferred to use a biaxially stretched film of a polyester resin and to perform thermal lamination without impairing the crystallinity, as will be described later. It is also preferred to use a film made of an amorphous resin having a high glass transition point such as an acrylic resin or a polycarbonate resin.

In the film-laminated metal sheet, the thickness of the resin film is preferably not less than 10 μm and not more than 100 μm. The lower limit of the thickness of the resin film is more preferably not less than 15 μm, even more preferably not less than 20 μm, and particularly preferably not less than 25 μm. The upper limit of the thickness of the resin film is more preferably not more than 80 μm, even more preferably not more than 60 μm, and particularly preferably not more than 50 μm. When the thickness of the resin film is not less than 10 μm, the film is less likely to be affected by surface irregularities of the metal sheet. Therefore, a film-laminated metal sheet having a resin film with a smoother surface can be obtained. When the thickness of the resin film is not more than 100 μm, it is possible to obtain a film-laminated metal sheet in which moisture contained in the resin film has less influence on the formation of dark spots and on the life of organic EL.

In the film-laminated metal sheet, the resin film preferably contains a polyester resin, an acrylic resin, or a polycarbonate resin as a main component. "Main component" refers to a particular component which accounts for 80% by mass or more, more preferably 85% by mass or more, even more preferably 90% by mass or more, and particularly preferably 95% by mass or more of all the components. The main component may account for 100% by mass.

The polyester resin for use in the film-laminated metal sheet is preferably a resin obtained by polymerization of a monomer containing an aromatic dicarboxylic acid or an aliphatic dicarboxylic acid as a main component and a monomer containing a diol as a main component, or a mixture of such resins.

Examples of the aromatic dicarboxylic acid include terephthalic acid, isophthalic acid, phthalic acid, naphthalenedicarboxylic acid, diphenyldicarboxylic acid, diphenyletherdicarboxylic acid, diphenylsulfonedicarboxylic acid, diphenoxyethanedicarboxylic acid, and 5-sodiumsulfoisophthalic acid. Examples of the aliphatic dicarboxylic acid include oxalic acid, succinic acid, adipic acid, suberic acid, sebacic acid, dimer acid, maleic acid, fumaric acid, dodecanedioic acid, cyclohexanedicarboxylic acid, and ester derivatives thereof. These acid components may be used singly or in a combination of two or more. Further, an oxycarboxylic acid such as p-oxybenzoic acid may be copolymerized.

Examples of the diol component include ethylene glycol, propanediol, butanediol, pentanediol, hexanediol, neopentyl glycol, cyclohexanedimethanol, diethylene glycol, triethylene glycol, polyalkylene glycol, 2,2-bis(4-hydroxyethoxyphenyl) propane, isosorbide (1,4:3,6-dianhydroglucitol, 1,4:3,6-dianhydro-D-sorbitol), spiroglycol, bisphenol A, and bisphenol S. Among them, ethylene glycol is preferred. These diol components may be used singly or in a combination of two or more.

The polyester resin for use in the film-laminated metal sheet is preferably polyethylene terephthalate (PET) or polyethylene naphthalate (PEN) from the viewpoint of adhesion to the metal sheet and heat resistance. A mixture of these resins can also be preferably used.

The acrylic resin for use in the film-laminated metal sheet is preferably a resin obtained by polymerization of a monomer containing an acrylate compound as a main component, or a mixture of such resins. The acrylate compound may be, for example, a monoacrylate compound, a monomethacrylate compound, a diacrylate compounds, or a dimethacrylate compound.

Examples of the monoacrylate compound include methyl acrylate, ethyl acrylate, propyl acrylate, isopropyl acrylate, n-butyl acrylate, isobutyl acrylate, t-butyl acrylate, amyl acrylate, isoamyl acrylate, hexyl acrylate, heptyl acrylate, octyl acrylate, 2-ethylhexylacrylate, nonyl acrylate, decyl acrylate, isodecyl acrylate, lauryl acrylate, tridecyl acrylate, hexadecyl acrylate, stearyl acrylate, isostearyl acrylate, cyclohexyl acrylate, isobornyl acrylate, diethylene glycol acrylate, polyethylene glycol acrylate, polypropylene glycol acrylate, 2-methoxyethyl acrylate, 2-ethoxyethyl acrylate, 2-butoxyethyl acrylate, methoxy diethylene glycol acrylate, methoxypolyethylene glycol acrylate, dicyclopentenyloxyethyl acrylate, 2-phenoxyethyl acrylate, phenoxydiethylene glycol acrylate, phenoxypolyethylene glycol acrylate, 2-benzoyloxyethyl acrylate, 2-hydroxy-3-phenoxypropyl acrylate, benzyl acrylate, 2-cyanoethyl acrylate, γ-acryloxyethyltrimethoxysilane, glycidyl acrylate, tetrahydrofurfuryl acrylate, dimethylaminoethyl acrylate, acryloxyethyl phosphate, and acryloxyethylphenyl acid phosphate.

Examples of the monomethacrylate compound include methyl methacrylate, ethyl methacrylate, propyl methacrylate, isopropyl methacrylate, n-butyl methacrylate, isobutyl methacrylate, t-butyl methacrylate, amyl methacrylate, isoamyl methacrylate, hexyl methacrylate, heptyl methacrylate, octyl methacrylate, 2-ethylhexyl methacrylate, nonyl methacrylate, decyl methacrylate, isodecyl methacrylate, lauryl methacrylate, tridecyl methacrylate, hexadecyl methacrylate, stearyl methacrylate, isostearyl methacrylate, cyclohexyl methacrylate, isobornyl methacrylate, diethylene glycol methacrylate, polyethylene glycol methacrylate, polypropylene glycol methacrylate, 2-methoxyethyl methacrylate, 2-ethoxyethyl methacrylate, 2-butoxyethyl methacrylate, methoxydiethylene glycol methacrylate, methoxypolyethylene glycol methacrylate, dicyclopentenyloxyethyl methacrylate, 2-phenoxyethyl methacrylate, phenoxy diethylene glycol methacrylate, phenoxy polyethylene glycol methacrylate, 2-benzoyloxyethyl methacrylate, 2-hydroxy-3-phenoxypropyl methacrylate, benzyl methacrylate, 2-cyanoethyl methacrylate, γ-methacryloxyethyltrimethoxysilane, glycidyl methacrylate, tetrahydrofurfuryl methacrylate, dimethylaminoethyl methacrylate, methacryloxyethyl phosphate, and methacryloxyethylphenyl acid phosphate.

Examples of the diacrylate compound include ethylene glycol diacrylate, 1,4-butanediol diacrylate, 1,6-hexanediol diacrylate, 1,9-nonanediol diacrylate, 1,3-butanediol diacrylate, neopentyl glycol diacrylate, triethylene glycol diacrylate, tetraethylene glycol diacrylate, polyethylene glycol diacrylate, tripropylene glycol diacrylate, polypropylene glycol diacrylate, a reaction product of 1 mol of bisphenol A, bisphenol F, or bisphenol AD and 2 mol of glycidyl acrylate, a diacrylate of a polypropylene oxide adduct of bisphenol A, bisphenol F, or bisphenol AD, bis(acryloxypropyl)polydimethylsiloxane, and bis(acryloxypropyl)methylsiloxane-dimethylsiloxane copolymers.

Examples of the dimethacrylate compound include ethylene glycol dimethacrylate, 1,4-butanediol dimethacrylate, 1,6-hexanediol dimethacrylate, 1,9-nonanediol dimethacrylate, 1,3-butanediol dimethacrylate, neopentyl glycol dimethacrylate, triethylene glycol dimethacrylate, tetraethylene glycol dimethacrylate, polyethylene glycol dimethacrylate, tripropylene glycol dimethacrylate, polypropylene glycol dimethacrylate, a reaction product of 1 mol of bisphenol A, bisphenol F, or bisphenol AD and 2 mol of glycidyl methacrylate, a dimethacrylate of a polypropylene oxide adduct of bisphenol A, bisphenol F, or bisphenol AD, bis(methacryloxypropyl)polydimethylsiloxane, and bis(methacryloxypropyl)methylsiloxane-dimethylsiloxane copolymers. The above-listed acrylate compounds may be used singly or in a combination of two or more.

The acrylic resin for use in the film-laminated metal sheet is preferably polymethyl methacrylate (PMMA) from the viewpoint of adhesion to the metal sheet. It is preferred to use methyl methacrylate in combination with an acrylate compound(s), other than methacrylates, as listed above from the viewpoint of controlling the glass transition point.

The polycarbonate resin for use in the film-laminated metal sheet is preferably a resin obtained by polymerization of an aromatic dihydroxy compound and a compound capable of forming a carbonate bond such as phosgene or diphenyl carbonate, or a mixture of such resins.

Examples of the aromatic dihydroxy compound include bis(hydroxyaryl)alkanes such as 1,1-bis(4-hydroxy-3-t-butylphenyl)propane, 2,2-bis(4-hydroxy-3-t-butylphenyl)propane, 2,2-bis(4-hydroxy phenyl)propane, 2,2-bis(4-hydroxy-3-bromophenyl)propane, and 2,2-bis(4-hydroxy-3,5-dibromophenyl)propane; bis(hydroxyaryl)cycloalkanes such as 1,1-bis(4-hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxyaryl sulfides such as 4,4'-dihydroxydiphenyl sulfide and 4,4'-dihydroxy-3,3'-dimethylphenyl sulfide; dihydroxyaryl sulfoxides such as 4,4'-dihydroxydiphenyl sulfoxide and 4,4'-dihydroxy-3,3'-dimethylphenyl sulfoxide; and dihydroxyaryl sulfones such as 4,4'-dihydroxydiphenyl sulfone and 4,4'-dihydroxy-3,3'-dimethylphenyl sulfone. Among them, 2,2-bis(4-hydroxyphenyl) propane (bisphenol A) is preferably used. These aromatic dihydroxy compounds may be used singly or in a combination of two or more. A polycarbonate in which the carbonic acid component is generally partially replaced with a terephthalic acid component and/or an isophthalic acid component may also be used.

A polyfunctional compound such as trimellitic acid, trimesic acid, or trimethylolpropane may be copolymerized in the resin film for use in the film-laminated metal sheet as long as the desired effects are not impaired. Further, a resin component(s) other than the above-described main components may also be used for the purpose of imparting functionality. Examples of such resin components, other than the polyester resin, the acrylic resin, and the polycarbonate resin, include linear polyolefins such as polyethylene, polypropylene, poly(4-methylpentene-1), and polyacetal, alicyclic polyolefins obtained by ring-opening metathesis polymerization or addition polymerization of a norbornene, or by addition copolymerization of a norbornene with other olefin(s), biodegradable polymers such as polylactic acid and polybutyl succinate, polyamides such as nylon 6, nylon 11, nylon 12, and nylon 66, aramid, polyvinyl chloride, polyvinylidene chloride, polyvinyl alcohol, polyvinyl butyral, an ethylene-vinyl acetate copolymer, polyacetal, polyglycolic acid, polystyrene, styrene-copolymerized polymethyl methacrylate, polyether sulfone, polyether ether ketone, modified polyphenylene ether, polyphenylene sulfide, polyetherimide, polyimide, polyarylate, a tetrafluoroethylene resin, a trifluoroethylene resin, a trifluoroethylene chloride resin, a tetrafluoroethylene-hexafluoropropylene copolymer, and polyvinylidene fluoride. These components may be used either as a copolymer component or as a mixture component.

From the viewpoint of enhancing heat resistance, it is preferred to add not less than 0.0001% by mass and not more than 1.0% by mass, more preferably not less than 0.001% by mass and not more than 1.0% by mass, of a known antioxidant to the resin film for use in the film-laminated metal sheet. There is no particular limitation on the type of antioxidant. For example, known antioxidants such as those classified as hindered phenols, hydrazines, and phosphites can be used.

The resin film for use in the film-laminated metal sheet may contain various additives in addition to the above-described antioxidant as long as the desired effects are not impaired. Examples of the additives include a slipping agent, a crystal nucleating agent, a heat stabilizer, an anti-static agent, an anti-blocking agent, a filler, and a viscosity modifier. While such additives may be mixed into the resin film, a lubricant such as a slipping agent or an anti-blocking agent, in particular, may be mixed with a solvent to prepare a slurry, and the slurry may be applied to the surface of the film, followed by drying to impart functionality. This method is preferred in that a small amount of lubricant can be dispersed on the surface of the resin film. The use of a resin film with a small amount of lubricant dispersed thereon is preferred in that the smoothness of the film-laminated metal sheet, i.e., the arithmetic average roughness Sa, the maximum peak height Sp, and the kurtosis Sku of the surface of the resin film, can be controlled in a preferable low range, and that the static friction coefficient μs can be controlled in a preferable range so that when the film-laminated metal sheet is used as an organic EL substrate, meandering and the formation of flaws on a roller during a production process can be reduced. It is particularly preferred to use a resin film containing no lubricant. When a small amount of lubricant is dispersed, the average particle size of the lubricant is 0.3 μm or less, preferably 0.2 μm or less, more preferably 0.1 μm or less. Whether the resin film contains no lubricant or contains a small amount of lubricant can be determined by measuring the ash content of the resin film. When the resin film contains no lubricant, it has an ash content of 500 ppm or less.

While a resin film having a single-layer structure of the same resin composition can be preferably used for the film-laminated metal sheet, it is also preferred to use a resin film having a multilayer structure of two or more layers for the purpose of imparting functionality. For example, a surface layer to be provided on the bonding surface of the metal sheet may have surface irregularities for the purpose of preventing inter-film blocking, while the opposite surface layer may be made of a resin composition having excellent smoothness. This enables the film-laminated metal sheet to have both the performance of a resin film and the function of a substrate for flexible electronics. The film layers may be laminated not only in the thickness direction but in the length direction or the width direction. Lamination in the thickness direction is preferred from the viewpoint of imparting a function as a film-laminated metal sheet. Lamination may be performed by co-extrusion using a feed block method or a multi-manifold method or by a lamination method involving bonding another film or applying a molten resin composition directly onto a film. It is also possible to use a coating method in which a resin composition dissolved in a solvent is applied to a film, followed by drying.

The resin film for use in the film-laminated metal sheet is preferably a biaxially stretched film from the viewpoint of reducing variation in thickness and, in a polyester resin, from the viewpoint of biaxially oriented crystals contributing to heat resistance. Biaxial stretching can be performed by a successive biaxial stretching method in which stretching in the longitudinal direction (length direction) and stretching in the lateral direction (width direction) are performed successively, or by a simultaneous biaxial stretching method in which stretching in the longitudinal direction and stretching in the lateral direction are performed simultaneously. In the successive biaxial stretching method, it is preferred to stretch a film first in the longitudinal direction and then stretch the film in the lateral direction from the viewpoint of uniform quality and saving of facility space.

A method of producing our film-laminated metal sheet will now be described. This disclosure is, however, not necessarily limited to the method. When the film-laminated metal sheet is produced, a preferred polyester resin as described above is first prepared in the form of pellets or the like. The pellets are dried in hot air or under vacuum as necessary, and then supplied to an extruder together with various additives. In the extruder, the resin is heated to a temperature higher than or equal to the melting point, and the amount of molten resin extruded is equalized by a gear pump or the like. Foreign matter, denatured resin and the like are removed through a filter or the like. In a multilayer structure, another resin is supplied to an extruder different from the above-described extruder, and the resins are fed through different flow paths into a lamination device. A feed block or a multi-manifold die can be used as the lamination device.

The molten resin is formed into a sheet by a T-die and then discharged. The molten sheet discharged from the T-die is extruded onto a cooling body such as a casting drum, and then cooled and solidified to obtain an unstretched film. To enhance adhesion between the cooling body such as a casting drum and the molten sheet, it is preferred to bring the molten sheet into close contact with the cooling body by electrostatic force using an electrode such as a wire-shaped, tape-shaped, needle-shaped, or knife-shaped electrode, and rapidly cool and solidify the molten sheet. Also preferred are a method in which the molten resin is brought into close contact with a cooling body by blowing air from a slit-shaped, spot-shaped, or planar device and is rapidly cooled and solidified, a method in which the molten resin is brought into close contact with a cooling body by using a nip roller and is rapidly cooled and solidified, and a combination of these methods.

The unstretched film thus obtained is preferably biaxially stretched in the longitudinal direction (length direction) and in the lateral direction (width direction). The following is a description of a successive biaxial stretching method in which the film is first stretched in the longitudinal direction, and then stretched in the lateral direction.

First, the unstretched film obtained is stretched in the longitudinal direction. Stretching in the longitudinal direction means stretching that imparts molecular orientation in the length direction to the film. Longitudinal stretching is generally performed by using a difference in peripheral speed between rollers. Stretching in the running direction may be performed in one step or in multiple steps using a plurality of pairs of rollers. While the stretching magnification in longitudinal stretching varies depending on the type of resin, it is preferably not less than 3.0 times and not more than 6.0 times, more preferably not less than 3.3 times and not more than 5.0 times, and even more preferably not less than 3.5 times and not more than 4.5 times. When the stretching magnification is within the above range, it is possible to efficiently obtain a film having small surface irregularities, that is, a film having a surface whose arithmetic average roughness Sa, maximum peak height Sp, and maximum valley depth Sv are each controlled within a preferable low range.

The stretching temperature in longitudinal stretching is preferably not less than the glass transition point of the resin constituting the resin film and not more than the glass transition point+50° C., more preferably not less than the glass transition point+5° C. and not more than the glass transition point+40° C., and particularly preferably not less than the glass transition point+10° C. and not more than the glass transition point+30° C. When the stretching temperature is within the above range, it is possible to efficiently obtain a film having small surface irregularities, that is, a film having a surface whose arithmetic average roughness Sa, maximum peak height Sp, and maximum valley depth Sv are each controlled within a preferable low range.

The uniaxially stretched resin film is once gradually cooled, and then introduced into a tenter stretching machine, with the ends of the resin film being held. The stretching magnification in lateral stretching is preferably not less than 3.0 times and not more than 8.0 times, more preferably not less than 3.5 times and not more than 7.0 times, and even more preferably not less than 4.0 times and not more than 6.0 times. When the stretching magnification is within the above range, it is possible to efficiently obtain a film having little variation in thickness and small surface irregularities, that is, a film having a surface whose arithmetic average roughness Sa, maximum peak height Sp, and maximum valley depth Sv are each controlled within a preferable low range.

The stretching temperature in lateral stretching is preferably not less than the glass transition point of the resin constituting the resin film and not more than the glass transition point+80° C., more preferably not less than the glass transition point+10° C. and not more than the glass transition point+70° C., and particularly preferably not less than the glass transition point+15° C. and not more than the glass transition point+60° C. When the stretching temperature is within the above range, it is possible to efficiently obtain a film having little variation in thickness and small surface irregularities, that is, a film having a surface whose arithmetic average roughness Sa, maximum peak height Sp, and maximum valley depth Sv are each controlled within a preferable low range.

The laterally stretched film is then preferably heat-set. Heat setting is preferably performed in a tenter heated to a high temperature. The heat setting temperature is preferably not less than the stretching temperature in lateral stretching and not more than the melting point−50° C., more preferably not less than the stretching temperature in lateral stretching+20° C. and not more than the melting point−60° C., and particularly preferably not less than the stretching temperature in lateral stretching+40° C. and not more than the melting point−70° C. When the heat setting temperature is within the above range, it is possible to efficiently obtain a film having little variation in thickness and small surface irregularities, that is, a film having a surface whose arithmetic average roughness Sa, maximum peak height Sp, and maximum valley depth Sv are each controlled within a preferable low range.

Heat setting may be performed while relaxing the film in the length direction and/or the width direction. The relaxation rate is preferably not less than 0.3% and not more than 5.0%, more preferably not less than 0.5% and not more than 4.0%, and even more preferably not less than 0.8% and not more than 3.0%. It is preferred to simultaneously perform heat setting and relaxation because the residual stress of the biaxially oriented resin film is further reduced. When the relaxation rate is within the above range, the residual stress can be reduced more effectively, and a film having little variation in thickness and small surface irregularities can be obtained. That is, it is possible to efficiently obtain a film having a surface whose arithmetic average roughness Sa, maximum peak height Sp, and maximum valley depth Sv are each controlled within a preferable low range. The heat-set resin film is then gradually cooled in the tenter to obtain a biaxially stretched film.

A protective film is preferably attached to at least the surface of the resin film which is opposite to the surface to be bonded to the metal sheet (i.e., on the surface layer side of the film-laminated metal sheet), because high surface smoothness of the film-laminated metal sheet can be maintained, that is, because the arithmetic average roughness Sa, the maximum peak height Sp, the maximum valley depth Sv, and the kurtosis Sku of the surface of the resin film can each be controlled within a preferable low range. The protective film can prevent formation of scratches or press marks in the surface of the resin film when the resin film is laminated to the metal sheet or when the film-laminated metal sheet is used as a substrate for flexible electronics. The protective film attached to the resin film preferably contains a polyester resin such as PET or PEN as a base material so that the protective film will not melt or undergo a dimensional change during thermal lamination. Further, since the protective film needs to be peeled off when the film-laminated metal sheet is used as a substrate for flexible electronics, the surface of the protective film to be bonded to the resin film is preferably only slightly sticky.

A metal sheet is covered with the resin film described above by thermal lamination. Specifically, a method (thermal film lamination method) may be used which involves heating the metal sheet at a temperature exceeding the melting point of the resin film and bringing the resin film into contact with one or both surfaces of the metal sheet using lamination rollers, thereby performing thermal lamination. This method is preferred in that it does not use an organic solvent or a large-sized drying oven and therefore has a low environmental burden, and that it has excellent productivity because a metal sheet having both surfaces thereof covered with resin films can be obtained in a roll-to-roll manner. Further, this method is preferred also in that since it does not use an adhesive or the like and only uses a resin film which is an insulating film and a metal sheet having heat resistance, flexibility, and gas barrier properties, impurities that reduce the luminescent efficiency of organic EL are unlikely to be mixed. When the film-laminated metal sheet is used as a substrate for flexible electronics, a transparent electrode such as ITO is sometimes formed on the surface by etching, and the metal sheet may dissolve in the etching solution. Therefore, it is preferred to laminate resin films to both surfaces of the metal sheet. In that example, the resin film on the surface of the metal sheet which is opposite to the surface covered with the resin film is not particularly limited as long as it adheres to the metal sheet. However, a thermoplastic resin film is preferred. For example, a commercially available PET film can be used.

The resin film covering the film-laminated metal sheet is required to have surface smoothness and heat resistance. Therefore, it is preferred that only a portion with a slight thickness which is to contact the metal sheet be melted and bonded to the metal sheet. In a polyester resin film, the temperature of the metal sheet at the start of lamination is preferably not less than the melting point−20° C. and not more than the melting point, more preferably not less than the melting point−15° C. and not more than the melting point−5° C. In an acrylic resin or polycarbonate resin film, the temperature of the metal sheet at the start of lamination is preferably not less than the glass transition point+20° C. and not more than the glass transition point+100° C., more preferably not less than the glass transition point+40° C. and not more than the glass transition point+80° C.

When the temperature of the metal sheet is within the above range, the intended adhesion between the resin film and the metal sheet and the intended surface smoothness can be obtained. Thus, it is possible to obtain an excellent film-laminated metal sheet in which the arithmetic average roughness Sa, the maximum peak height Sp, the maximum valley depth Sv, and the kurtosis Sku of the surface of the resin film are each small. Further, the resin film is unlikely to be cold-crystallized, and the ΔHc/ΔHm and the glass transition point Tg of the resin film can be easily controlled within a preferable range. The temperature history that the resin film undergoes during lamination is preferably such that the film is pressed by lamination rollers for a time of not less than 15 msec and not more than 35 msec, more preferably not less than 20 msec and not more than 30 msec. When the lamination time is within the above range, deformation of the film surface due to the temperature history during lamination can be reduced, and the intended adhesion between the resin film and the metal sheet and the intended surface smoothness can be obtained. Thus, it is possible to obtain an excellent film-laminated metal sheet in which the arithmetic average roughness Sa, the maximum peak height Sp, the maximum valley depth Sv, and the kurtosis Sku of the surface of the resin film are each small. Further, the resin film is unlikely to be cold-crystallized, and the ΔHc/ΔHm and the glass transition point Tg of the resin film can be easily controlled within a preferable range. The surface pressure applied by lamination rollers during lamination is preferably not less than 10 $kgf/cm^2$ and not more than 25 $kgf/cm^2$, more preferably not less than 12 $kgf/cm^2$ and not more than 23 $kgf/cm^2$, and even more preferably not less than 15 $kgf/cm^2$ and not more than 20 $kgf/cm^2$. When the surface pressure is within the above range, entry of air bubbles between the film and the metal sheet during lamination can be reduced, and the intended adhesion between the resin film and the metal sheet and the intended surface smoothness can be obtained. Thus, it is possible to obtain an excellent film-laminated metal sheet in which the arithmetic average roughness Sa, the maximum peak height Sp, the maximum valley depth Sv, and the kurtosis Sku of the surface of the resin film are each small.

Further, it is preferred to cool in advance the surface of the resin film which is not to be bonded to the metal sheet, namely, the front surface of the resin film so that it will not undergo a heat history. Usable methods of cooling the front surface of the resin film include a method including nipping the film with cooling rollers, a method including cooling the front surface with a cooling gas, and a method including surrounding the area around the laminated portion with a cooling tank. The method including nipping the film with cooling rollers is preferred. The temperature of the lamination cooling rollers is preferably not less than 20° C. and not more than 50° C., more preferably not less than 25° C. and not more than 45° C. When the temperature of the cooling rollers is within the above range, deformation of the film surface due to the temperature history during lamination can be reduced, and the intended adhesion between the resin film and the metal sheet and the intended surface smoothness can be obtained. Thus, it is possible to obtain an excellent film-laminated metal sheet in which the arithmetic average roughness Sa, the maximum peak height Sp, the maximum valley depth Sv, and the kurtosis Sku of the surface of the resin film are each small. Further, the resin film is unlikely to be cold-crystallized, and the ΔHc/ΔHm and the glass transition point Tg of the resin film can be easily controlled within a preferable range. The laminated metal sheet is preferably water-cooled immediately so that the surface smoothness and heat resistance of the resin film will not be impaired. The time from lamination of the resin film to water cooling is preferably not less than 0.1 seconds and not more than 0.8 seconds. When the time is within the above range, the arithmetic average roughness Sa, the maximum peak height Sp, the maximum valley depth Sv, and the kurtosis Sku of the surface of the resin film can be controlled in a low range. Further, the resin film is unlikely to be cold-crystallized, and the ΔHc/ΔHm and the glass transition point Tg of the resin film can be easily controlled within a preferable range. Thus, it is possible to obtain a film-laminated metal sheet having excellent surface smoothness and heat resistance.

An aluminum sheet, a mild steel sheet and the like, which are widely used as materials for cans, can be used as the metal sheet. In particular, for example, a surface-treated steel sheet (so-called TFS) having a two-layer coating composed of a lower layer of metallic chromium and an upper layer of chromium hydroxide is most suitable. There is no particular limitation on the coating weights of the metallic chromium layer and the chromium hydroxide layer of the TFS. From the viewpoint of post-processing adhesion and corrosion resistance, the coating weight of the metallic chromium layer is desirably not less than 50 $mg/m^2$ and not more than 200 $mg/m^2$, and the coating weight of the chromium hydroxide layer is desirably not less than 5 $mg/m^2$ and not more than 35 $mg/m^2$, both in terms of Cr.

The film-laminated metal sheet can be preferably used as a substrate for flexible electronics, particularly as an organic EL substrate, in terms of smoothness, heat resistance, flexibility, and gas barrier properties.

EXAMPLES

The following examples illustrate our concepts in greater detail.

Example 1

PET pellets, serving as a polyester resin, that had a glass transition point of 80° C. and a melting point of 250° C. were prepared as a raw resin for a resin film, and fully dried at a high temperature under vacuum so that the pellets did not contain any moisture. The dried pellets were fed into a single-screw extruder and melt-kneaded at 280° C. without adding particles for purposes such as slipping properties or anti-blocking properties. Subsequently, foreign matter was removed through a 25 μm-cut sintered filter, and then the molten resin was discharged from a T-die and cooled and solidified on a casting drum whose surface temperature was controlled at 25° C. to obtain an unstretched film. Subsequently, the resin film was preheated to 95° C. using heated ceramic rollers and stretched to 3.5 times the original length in the longitudinal direction. Thereafter, the resin film was introduced into a tenter stretching machine, with the ends of the resin film being held by clips, and the film was stretched at 100° C. to 4.0 times the original width in the lateral direction. The resin film was then subjected to 0.8% relaxation in the lateral direction while being heat-set at 140° C. Thereafter, the resin film was gradually cooled to room temperature, and the resin film whose ends had been removed was coiled on a winder to obtain a biaxially stretched film having a thickness of 50 μm. Subsequently, a PEN protective film having a thickness of 125 μm was attached to the resulting biaxially stretched film. Subsequently, the resulting biaxially stretched film was laminated to a metal sheet. Using a TFS (metallic Cr layer: 120 mg/m$^2$, Cr oxide layer: 10 mg/m$^2$ in terms of metallic Cr) having a thickness of 0.22 mm as the metal sheet, both surfaces of the metal sheet were covered with resin films by a thermal film lamination method. The above biaxially stretched film was laminated to one surface of the metal sheet, and a PET film (LUMIRROR (registered trademark) S10: 20 μm) manufactured by Toray Industries, Inc. was laminated to the other surface of the metal sheet. The specific lamination conditions were as follows: a metal sheet temperature of 245° C. immediately before lamination; a lamination cooling roller temperature of 25° C.; and a surface pressure applied during lamination of 15 kgf/cm$^2$. The time for pressing with lamination rollers was 20 msec. The temperature before lamination was measured (at a distance of 100 mm from the nip position) as the lamination temperature using a radiation thermometer. The laminate was water-cooled 0.1 seconds after thermal lamination to obtain a film-laminated metal sheet having both surfaces thereof covered with the resin films.

Example 2

A film-laminated metal sheet was obtained in the same manner as in Example 1 except that 300 ppm of $SiO_2$ particles having an average particle diameter of 0.1 μm were added to the PET resin to improve transportability during the production of the film and the coiling properties of the film.

Example 3

A film-laminated metal sheet was obtained in the same manner as in Example 1 except that 500 ppm of $SiO_2$ particles having an average particle diameter of 0.1 μm were added to the PET resin.

Example 4

A film-laminated metal sheet was obtained in the same manner as in Example 1 except that the surface pressure applied during lamination was changed to 12 kgf/cm$^2$.

Example 5

A film-laminated metal sheet was obtained in the same manner as in Example 1 except that the surface pressure applied during lamination was changed to 10 kgf/cm$^2$.

Example 6

A film-laminated metal sheet was obtained in the same manner as in Example 1 except that the surface pressure applied during lamination was changed to 23 kgf/cm$^2$.

Example 7

A film-laminated metal sheet was obtained in the same manner as in Example 1 except that the surface pressure applied during lamination was changed to 25 kgf/cm$^2$.

Example 8

A film-laminated metal sheet was obtained in the same manner as in Example 1 except that 300 ppm of $SiO_2$ particles having an average particle diameter of 0.2 μm were added to the PET resin.

Example 9

A film-laminated metal sheet was obtained in the same manner as in Example 1 except that 300 ppm of $SiO_2$ particles having an average particle diameter of 0.3 μm were added to the PET resin.

Example 10

A film-laminated metal sheet was obtained in the same manner as in Example 1 except that 800 ppm of $SiO_2$ particles having an average particle diameter of 0.1 μm were added to the PET resin.

Example 11

A film-laminated metal sheet was obtained in the same manner as in Example 1 except that 1000 ppm of $SiO_2$ particles having an average particle diameter of 0.1 μm were added to the PET resin.

Example 12

A film-laminated metal sheet was obtained in the same manner as in Example 1 except that 300 ppm of $SiO_2$ particles having an average particle diameter of 0.2 μm were added to the PET resin, and that the surface pressure applied during lamination was changed to 10 kgf/cm$^2$.

Example 13

A film-laminated metal sheet was obtained in the same manner as in Example 1 except that the temperature at the start of lamination was changed to 251° C., and that the time from lamination of the resin film to water cooling was changed to 1.0 second.

Example 14

A film-laminated metal sheet was obtained in the same manner as in Example 1 except that the amount of resin discharged from the T-die was controlled so that the thickness of the biaxially stretched film would be 110 μm.

Example 15

A film-laminated metal sheet was obtained in the same manner as in Example 1 except that a PMMA resin having a glass transition point of 125° C. was used for the resin film, and that the temperature of the metal sheet at the start of lamination was changed to 205° C.

Example 16

A film-laminated metal sheet was obtained in the same manner as in Example 1 except that a polycarbonate (PC)

resin having a glass transition point of 150° C. was used for the resin film, and that the temperature of the metal sheet at the start of lamination was changed to 230° C.

Comparative Example 1

A film-laminated metal sheet was obtained in the same manner as in Example 1 except that 1000 ppm of $SiO_2$ particles having an average particle diameter of 0.5 μm were added to the PET resin.

Comparative Example 2

A film-laminated metal sheet was obtained in the same manner as in Example 1 except that the unstretched film was not subjected to stretching.

Comparative Example 3

A film-laminated metal sheet was obtained in the same manner as in Example 1 except that the resin films were laminated to the metal sheet using a polyester adhesive instead of the thermal lamination method.

The properties of the film-laminated metal sheets obtained were measured and evaluated by the following methods.

(1) Arithmetic Average Roughness, Maximum Peak Height, Maximum Valley Depth, and Kurtosis Using a 3D measuring laser microscope LEXT (OLS5000) manufactured by Olympus Corporation, measurement was performed with a 50× objective lens (according to ISO 25178-2:2012). The measurement range was 250 μm×250 μm, and measurement was performed in air at room temperature. Each of the arithmetic average roughness Sa, the maximum peak height Sp, the maximum valley depth Sv, and the kurtosis Sku of the resin film of each film-laminated metal sheet was measured at three randomly selected points, and the average value was determined.

(2) Ash Content

The metal sheet of each film-laminated metal sheet was dissolved in hydrochloric acid, and the resin film was obtained. In accordance with JIS K 7250, a resin film having an initial mass $W_0$ was placed in a platinum crucible, first fully combusted using a gas burner, and then treated at 750° C. to 800° C. in an electric furnace for one hour to completely incinerate the resin. The mass $W_1$ of the ash obtained was measured, and the ash content was calculated by the formula below. The same measurement was performed three times, and the average value was determined as the ash content.

$$\text{Ash content}=(W_1/W_0)\times 1{,}000{,}000\ (\text{ppm})$$

(3) Static Friction Coefficient

Each film-laminated metal sheet was cut into a sample size of 150 mm×40 mm, and the static friction coefficient of the sample was measured using a static friction coefficient measuring machine TYPE: 10, manufactured by Shinto Scientific Co., Ltd., with a 150-g planar indenter. The same measurement was performed five times, and the average value was determined as the static friction coefficient.

(4) Thickness of Resin Film

The metal sheet of each film-laminated metal sheet was dissolved in hydrochloric acid, and the resin film was obtained. The thickness of the resin film obtained was measured with a dial gauge 2110S-10 (probe with a carbide ball) manufactured by Mitutoyo Corporation that was installed on a dial gauge stand 7001-10 manufactured by Mitutoyo Corporation. Measurement was performed at 10 randomly selected points, and the average value was determined as the thickness of the resin film.

(5) Thermal Properties (Cold Crystallization Heat, Melting Heat, and Glass Transition Point) of Resin Film Each film-laminated metal sheet was cut into a sample size of 10 mm×10 mm and was then immersed in hydrochloric acid to dissolve only the metal sheet and isolate the resin film. 5 mg of the isolated resin film was placed as a sample in an aluminum pan and was subjected to measurement using a TA Instruments differential scanning calorimeter (DSC-Q100). First, the sample was cooled to −50° C. in a nitrogen atmosphere, and then heated to 290° C. at a rate of 20° C./min (1st run). The cold crystallization heat, the melting heat, and the glass transition point were determined from a chart obtained by the 1st-run measurement. The same measurement was performed three times, and the average values were determined as the cold crystallization heat ΔHc, the melting heat ΔHm, and the glass transition point Tg of the resin film.

(6) Luminescent Appearance of Organic EL Substrate

Using each film-laminated metal sheet as a substrate, an anode (aluminum-gold electrode), a hole transport layer, a light-emitting layer/electron transport layer, and a translucent cathode (silver-magnesium electrode) were vacuum-deposited in this order on the surface of the resin film. A metal mask was provided so that the light emission area would be 2 mm×2 mm. The specific method of preparing the organic EL device will be described below. First, the substrate was cleaned, and dried at 110° C. for 1 hour. Thereafter, the substrate was set in a vacuum deposition equipment, and the internal pressure was reduced to 0.001 Pa or less. Subsequently, aluminum and gold were deposited as an anode, and α-NPD (N,N'-diphenyl-N,N'-di(α-naphthyl)-benzidine) was deposited as a hole transport layer at a deposition rate of 6 nm/min to a thickness of 50 nm such that the deposited layer covered the anode. $Alq_3$ (tris(8-hydroxyquinoline) aluminum) was deposited as a light-emitting layer/electron transport layer on the hole transport layer at a deposition rate of 6 nm/min to a thickness of 50 nm. Last, silver and magnesium were deposited to form a translucent electrode as a cathode. The organic EL device thus prepared was sealed. 20 organic EL devices were prepared in the same manner. A voltage of 10 V was applied to each of the 20 devices, and its organic EL light emission was checked. The average number of dark spots per device was determined, and the luminescent appearance of each organic EL substrate was evaluated according to the criteria below.

A (excellent): 0 dark spots

B (good): 1 to 10 dark spots

C (acceptable): 11 to 100 dark spots

D (unacceptable): 101 or more dark spots (7) Electrical Insulating Properties of Organic EL Substrate 20 organic EL devices were prepared in the same manner as described above. Each device was energized by a voltage of 10 V, and its organic EL light emission was checked. The electrical insulating properties of each organic EL substrate were evaluated according to the criteria below.

A (excellent): all the 20 devices emitted light

B (good): 15 to 19 devices out of 20 devices emitted light (1 to 5 devices were short-circuited)

C (acceptable): 1 to 14 devices out of 20 devices emitted light (6 to 19 devices were short-circuited)

D (unacceptable): all the 20 devices were short-circuited and did not emit light (8) Luminescent Efficiency of Organic EL Substrate 20 organic EL devices were prepared in the same manner as described above. Each device was energized by a voltage of 5 V, and the current density was measured. The average value of the current densities of devices other than short-circuited devices was taken as the amount of leakage current, and the luminescent efficiency of each organic EL substrate was evaluated according to the criteria below.

A (excellent): the current density was less than $1.0\times10^{-5}$ mA/cm$^2$

B (good): the current density was not less than $1.0\times10^{-5}$ mA/cm$^2$ and not more than $1.0\times10^{-3}$ mA/cm$^2$ C (acceptable): the current density was not less than $1.0\times10^{-3}$ mA/cm$^2$ and not more than $1.0\times10^{-1}$ mA/cm$^2$ D (unacceptable): the current density was more than $1.0\times10^{-5}$ mA/cm$^2$, or all the devices were short-circuited The evaluation results of the organic EL substrates of Examples 1 to 16 and Comparative Examples 1 to 3 are shown in Table 1 below. In the Table, "-" for Tg indicates the absence of Tg.

As shown in Table 1, Comparative Examples 1 to 3 were rated D (unacceptable) for any or all of luminescent appearance, electrical insulating properties, and luminescent efficiency. On the other hand, Examples 1 to 16 were rated C (acceptable) or higher for any or all of luminescent appearance, electrical insulating properties, and luminescent efficiency. These properties are to be improved by achieving excellent smoothness and heat resistance. Thus, it is possible to provide a film-laminated metal sheet that satisfies the smoothness required for a substrate for flexible electronics. Our film-laminated metal sheets also have excellent properties as a substrate for flexible electronics, including flexibility, gas barrier properties, a low environmental burden, and excellent productivity.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Arithmetic average roughness | Sa | μm | 0.010 | 0.020 | 0.029 | 0.013 | 0.015 | 0.012 | 0.014 | 0.013 | 0.015 | 0.019 |
| Maximum peak height | Sp | μm | 0.12 | 0.14 | 0.15 | 0.20 | 0.27 | 0.09 | 0.08 | 0.13 | 0.15 | 0.18 |
| Maximum valley depth | Sv | μm | 0.10 | 0.13 | 0.15 | 0.15 | 0.15 | 0.28 | 0.49 | 0.12 | 0.15 | 0.17 |
| Kurtosis | Sku | μm | 2.2 | 2.4 | 2.5 | 2.2 | 2.3 | 2.1 | 2.0 | 2.9 | 3.3 | 2.6 |
| Ash content | | ppm | 50 | 300 | 500 | 50 | 50 | 50 | 50 | 300 | 300 | 900 |
| Static friction coefficient | μs | — | 0.82 | 0.55 | 0.48 | 0.80 | 0.86 | 0.89 | 0.95 | 0.58 | 0.49 | 0.59 |
| Cold crystallization heat | ΔHc | J/g | 7.2 | 7.2 | 7.2 | 7.2 | 7.2 | 7.2 | 7.2 | 7.2 | 7.2 | 7.2 |
| Melting heat | ΔHm | J/g | 49 | 49 | 49 | 49 | 49 | 49 | 49 | 49 | 49 | 49 |
| ΔHc/ΔHm | | — | 0.15 | 0.15 | 0.15 | 0.15 | 0.15 | 0.15 | 0.15 | 0.15 | 0.15 | 0.15 |
| Glass transition point | Tg | ° C. | — | — | — | — | — | — | — | — | — | — |
| Film thickness | | μm | 50 | 50 | 50 | 50 | 50 | 50 | 50 | 50 | 50 | 50 |
| Resin component | | | PET | PET | PET | PET | PET | PET | PET | PET | PET | PET |
| Evaluation of organic EL substrate | Luminescent appearance | | A | A | A | B | C | A | A | B | C | B |
| | Electrical insulating properties | | A | A | A | A | A | B | C | B | C | B |
| | Luminescent efficiency | | A | B | C | A | A | A | A | B | C | B |

| | | | Ex. 11 | Ex. 12 | Ex. 13 | Ex. 14 | Ex. 15 | Ex. 16 | Comp. Ex. 1 | Comp. Ex. 2 | Comp. Ex. 3 |
|---|---|---|---|---|---|---|---|---|---|---|---|
| Arithmetic average roughness | Sa | μm | 0.030 | 0.015 | 0.014 | 0.010 | 0.011 | 0.010 | 0.040 | 0.050 | 0.035 |
| Maximum peak height | Sp | μm | 0.29 | 0.30 | 0.14 | 0.10 | 0.14 | 0.15 | 0.32 | 0.48 | 0.22 |
| Maximum valley depth | Sv | μm | 0.31 | 0.11 | 0.45 | 0.12 | 0.35 | 0.14 | 1.2 | 0.43 | 0.29 |
| Kurtosis | Sku | μm | 3.5 | 2.9 | 2.2 | 2.3 | 2.4 | 2.5 | 4.1 | 3.1 | 2.6 |
| Ash content | | ppm | 1100 | 300 | 50 | 100 | 100 | 100 | 1200 | 50 | 1500 |
| Static friction coefficient | μs | — | 0.39 | 0.09 | 0.85 | 0.80 | 0.84 | 0.83 | 0.80 | 0.80 | 0.80 |
| Cold crystallization heat | ΔHc | J/g | 7.2 | 7.2 | 15 | 7.2 | 0 | 0 | 7.2 | 49 | 0 |
| Melting heat | ΔHm | J/g | 49 | 49 | 49 | 49 | 0 | 0 | 49 | 49 | 49 |
| ΔHc/ΔHm | | — | 0.15 | 0.15 | 0.31 | 0.15 | 0 | 0 | 0.15 | 1.0 | 0 |
| Glass transition point | Tg | ° C. | — | — | 80 | — | 125 | 150 | — | 80 | — |
| Film thickness | | μm | 50 | 50 | 50 | 110 | 50 | 50 | 50 | 50 | 50 |
| Resin component | | | PET | PET | PET | PET | PMMA | PC | PET | PET | PET |
| Evaluation of organic EL substrate | Luminescent appearance | | C | C | A | C | A | A | D | D | C |
| | Electrical insulating properties | | C | B | C | A | C | A | D | C | B |
| | Luminescent efficiency | | C | B | A | A | A | A | D | D | D |

INDUSTRIAL APPLICABILITY

It is possible to provide a film-laminated metal sheet, a substrate for flexible electronics, and an organic EL substrate which satisfy smoothness, heat resistance, flexibility, and gas barrier properties and have a low environmental burden and excellent productivity.

The invention claimed is:

1. A film-laminated metal sheet having at least one surface covered with a resin film, wherein an arithmetic average roughness Sa of a surface of the resin film is 0.030 μm or less, a maximum peak height Sp of the surface of the resin film is 0.30 μm or less, and a maximum valley depth Sv of the surface of the resin film is 1.0 μm or less; and wherein a kurtosis Sku of the surface of the resin film is not less than 2.0 and not more than 2.5.

2. The film-laminated metal sheet according to claim 1, wherein an ash content of the resin film is 1000 ppm or less.

3. The film-laminated metal sheet according to claim 1, wherein a static friction coefficient us of the resin film is not less than 0.10 and not more than 1.0.

4. The film-laminated metal sheet according to claim 1, wherein a ratio of a cold crystallization heat ΔHc to a melting heat ΔHm (ΔHc/ΔHm) obtained from DSC measurement of the resin film is 0.30 or less.

5. The film-laminated metal sheet according to claim 1, wherein a glass transition point Tg of the resin film is not less than 120° C. and not more than 200° C.

6. The film-laminated metal sheet according to claim 1, wherein a thickness of the resin film is not less than 10 μm and not more than 100 μm.

7. The film-laminated metal sheet according to claim 1, wherein the resin film comprises a polyester resin, an acrylic resin, or a polycarbonate resin as a main component.

8. A method of producing the film-laminated metal sheet according to claim 1, comprising covering a metal sheet with the resin film by thermal lamination.

9. A substrate for flexible electronics, comprising the film-laminated metal sheet according to claim 1.

10. An organic EL substrate comprising the film-laminated metal sheet according to claim 1.

* * * * *